US008688841B2

(12) United States Patent
Issa et al.

(10) Patent No.: US 8,688,841 B2
(45) Date of Patent: Apr. 1, 2014

(54) SYSTEM AND METHOD FOR CONTENT RIGHTS BASED ON EXISTENCE OF A VOICE SESSION

(75) Inventors: Alfredo C. Issa, Apex, NC (US);
Richard J. Walsh, Raleigh, NC (US);
Kenneth Jennings, Durham, NC (US)

(73) Assignee: Modena Enterprises, LLC,
Wilmington, DE (US)

( * ) Notice: Subject to any disclaimer, the term of this patent is extended or adjusted under 35 U.S.C. 154(b) by 237 days.

(21) Appl. No.: 12/133,445

(22) Filed: Jun. 5, 2008

(65) Prior Publication Data
US 2009/0307361 A1    Dec. 10, 2009

(51) Int. Cl.
*G06F 15/16*    (2006.01)
(52) U.S. Cl.
USPC ........................................ 709/227; 709/225
(58) Field of Classification Search
USPC .................................. 709/203, 205, 219, 227
See application file for complete search history.

(56) References Cited

U.S. PATENT DOCUMENTS

| | | | |
|---|---|---|---|
| 5,490,284 A | 2/1996 | Itoh et al. | |
| 5,818,935 A | 10/1998 | Maa | |
| 6,160,877 A | 12/2000 | Tatchell et al. | |
| 6,349,329 B1 | 2/2002 | Mackintosh et al. | |
| 7,260,198 B1 | 8/2007 | Scott et al. | |
| 7,269,249 B2 | 9/2007 | Woodring | |
| 7,280,646 B2 | 10/2007 | Urban et al. | |
| 7,444,413 B2 * | 10/2008 | Saxena ........................... | 709/229 |
| 7,546,641 B2 * | 6/2009 | Robert et al. .................... | 726/30 |
| 7,611,409 B2 * | 11/2009 | Muir et al. ........................ | 463/29 |
| 7,699,703 B2 * | 4/2010 | Muir et al. ........................ | 463/29 |
| 7,730,527 B2 * | 6/2010 | Charles et al. ................... | 726/11 |
| 7,761,515 B2 * | 7/2010 | Denninghoff ................. | 709/205 |
| 7,769,894 B2 | 8/2010 | Matz | |
| 7,941,481 B1 * | 5/2011 | Partovi et al. ................. | 709/203 |
| 8,204,184 B2 * | 6/2012 | Gao et al. .................... | 379/88.18 |
| 8,516,095 B2 * | 8/2013 | Eisener et al. ................ | 709/223 |

(Continued)

FOREIGN PATENT DOCUMENTS

| | | |
|---|---|---|
| CN | 1380768 | 11/2002 |
| CN | 101022535 | 8/2007 |

(Continued)

OTHER PUBLICATIONS

"DialPlus" Products page, http://www.dialplus.net/productp2p.html, printed Apr. 24, 2008, 1 page.

(Continued)

*Primary Examiner* — Sargon Nano

(57) ABSTRACT

Systems and methods are provided for granting digital content access rights to shared content based on the existence of a voice session, such as a mobile telecommunications voice call, between users. In general, in the preferred embodiment, a voice session is established between a first user and a second user via associated devices. Either automatically upon establishment of the voice session or upon request by the first user, access rights to content shared by the first user are granted to the second user. The content shared by the first user may be content hosted by the device of the first user, another device associated with the first user, a third-party service, or the like. The access rights granted to the second user allow access to the content shared by the first user while the voice session between the first and second users is active.

27 Claims, 7 Drawing Sheets

(56) References Cited

U.S. PATENT DOCUMENTS

| | | |
|---|---|---|
| 2001/0012303 A1 | 8/2001 | Gruse et al. |
| 2002/0042826 A1* | 4/2002 | Gaus et al. ............... 709/227 |
| 2003/0088677 A1* | 5/2003 | Yamamoto .............. 709/227 |
| 2003/0130953 A1* | 7/2003 | Narasimhan et al. ........ 705/59 |
| 2003/0191946 A1 | 10/2003 | Auer et al. |
| 2003/0217163 A1* | 11/2003 | Lagerweij et al. .......... 709/229 |
| 2004/0003041 A1* | 1/2004 | Moore et al. ............. 709/204 |
| 2004/0030750 A1* | 2/2004 | Moore et al. ............. 709/204 |
| 2005/0097595 A1* | 5/2005 | Lipsanen et al. ........... 725/25 |
| 2005/0163300 A1 | 7/2005 | Kawakami et al. |
| 2005/0216848 A1* | 9/2005 | Thompson et al. ......... 715/753 |
| 2005/0243979 A1* | 11/2005 | Starbuck et al. ........ 379/88.19 |
| 2005/0256870 A1* | 11/2005 | Benco et al. ................. 707/9 |
| 2005/0273848 A1* | 12/2005 | Charles et al. ............... 726/11 |
| 2006/0042483 A1 | 3/2006 | Work et al. |
| 2006/0156347 A1* | 7/2006 | Zhang et al. ................ 725/62 |
| 2007/0047519 A1 | 3/2007 | Bangor et al. |
| 2007/0126859 A1 | 6/2007 | Choi et al. |
| 2007/0192276 A1 | 8/2007 | Lee et al. |
| 2007/0196802 A1 | 8/2007 | Beletski et al. |
| 2007/0201502 A1 | 8/2007 | Abramson |
| 2007/0206736 A1 | 9/2007 | Sprigg et al. |
| 2007/0218980 A1 | 9/2007 | Pachnis et al. |
| 2007/0234213 A1 | 10/2007 | Krikorian et al. |
| 2007/0282621 A1 | 12/2007 | Altman et al. |
| 2008/0002022 A1 | 1/2008 | VanEpps |
| 2008/0005125 A1 | 1/2008 | Gaedeke |
| 2008/0040475 A1 | 2/2008 | Bosworth et al. |
| 2008/0045189 A1* | 2/2008 | Kim et al. ................ 455/414.2 |
| 2008/0046976 A1 | 2/2008 | Zuckerberg |
| 2008/0051071 A1 | 2/2008 | Vishwanathan et al. |
| 2008/0059992 A1 | 3/2008 | Amidon et al. |
| 2008/0066176 A1* | 3/2008 | Hamid ...................... 726/21 |
| 2008/0088698 A1 | 4/2008 | Patel et al. |
| 2008/0092201 A1 | 4/2008 | Agarwal et al. |
| 2008/0101604 A1 | 5/2008 | Kocher et al. |
| 2008/0103907 A1 | 5/2008 | Maislos et al. |
| 2008/0117295 A1 | 5/2008 | Ebrahimi et al. |
| 2008/0148363 A1 | 6/2008 | Gilder et al. |
| 2008/0154780 A1* | 6/2008 | Soukup et al. .............. 705/54 |
| 2008/0189336 A1 | 8/2008 | Prihodko |
| 2008/0259154 A1 | 10/2008 | Garrison et al. |
| 2008/0318560 A1 | 12/2008 | Reifman |
| 2009/0041311 A1 | 2/2009 | Hundley |
| 2009/0044278 A1 | 2/2009 | Lim |
| 2009/0055922 A1 | 2/2009 | Kotzin |
| 2009/0070334 A1 | 3/2009 | Callahan et al. |
| 2009/0077129 A1 | 3/2009 | Blose |
| 2009/0092237 A1 | 4/2009 | Chang et al. |
| 2009/0094330 A1 | 4/2009 | McQuaide, Jr. et al. |
| 2009/0094531 A1* | 4/2009 | Danieli et al. ............. 715/753 |
| 2009/0180621 A1 | 7/2009 | Kratz et al. |
| 2011/0004840 A1 | 1/2011 | Feinberg et al. |
| 2011/0208831 A1 | 8/2011 | Ho et al. |

FOREIGN PATENT DOCUMENTS

| | | |
|---|---|---|
| GB | 2397205 A | 7/2004 |
| WO | 00/33197 A1 | 6/2000 |
| WO | 03/047159 A1 | 6/2003 |
| WO | 2007083306 | 7/2007 |
| WO | 2007/108619 A1 | 9/2007 |
| WO | 2008/057288 A2 | 5/2008 |
| WO | 2008/062979 A1 | 5/2008 |

OTHER PUBLICATIONS

Kincaid, Jason, "Dial Plus Fetches Information As You Talk," http://www.techcrunch.com/2008/04/18/dial-plus-fetches-information-as-you-talk/, Apr. 18, 2008, 2 pages.

Raivio, Yrjo et al., "Digital Rights Management in the Mobile Environment," ICE-B International Conference on E-Business, 2006, pp. 182-185.

"Content-Based Access Control," author unknown but likely Hart, M., Johnson, R., and Stent, A. in 2006, found on webpage of Michael Hart, PhD candidate at Stony Brook University of Stony Brook, NY, at <http://www.cs.sunysb.edu/%7Emhart/cbac.pdf>, found Apr. 13, 2009, 11 pages.

"DialPlus—P2P," at <http://www.dialplus.net/productp2p.html>, copyright 2008, Dialplus, Inc., printed Apr. 24, 2008, 1 page.

Kincaid, Jason, "Dial Plus Fetches Information As You Talk," TechCrunch, available from <http://www.techcrunch.com/2008/04/18/dial-plus-fetches-information-as-you-talk/>, Apr. 18, 2008, printed Nov. 17, 2011, 2 pages.

"LinkedIn: Relationships Matter," at <http://www.linkedin.com/>, date unknown but website dates back to at least 2003, copyright 2009, LinkedIn Corportaion, printed Jan. 22, 2009, 1 page.

"MySpace," at <http://www.myspace.com/>, copyright 2003-2008, MySpace.com, printed Jan. 15, 2009, 1 page.

Ratiu, Florin, "People You May Know—Facebook," at <http://ja-jp.facebook.com/blog.php?post=15610312130>, posted May 1, 2008, printed Oct. 3, 2011, 4 pages.

"Skype official website—free download and free calls and Internet calls," at <http://www.skype.com/>, date unknown but website dates back to at least 2003, copyright 2009, Skype Limited, printed Jan. 22, 2009, 1 page.

"Welcome to Facebook! —Facebook," at <http://www.facebook.com/>, copyright 2008, Facebook, printed Jan. 9, 2008, 1 page.

\* cited by examiner

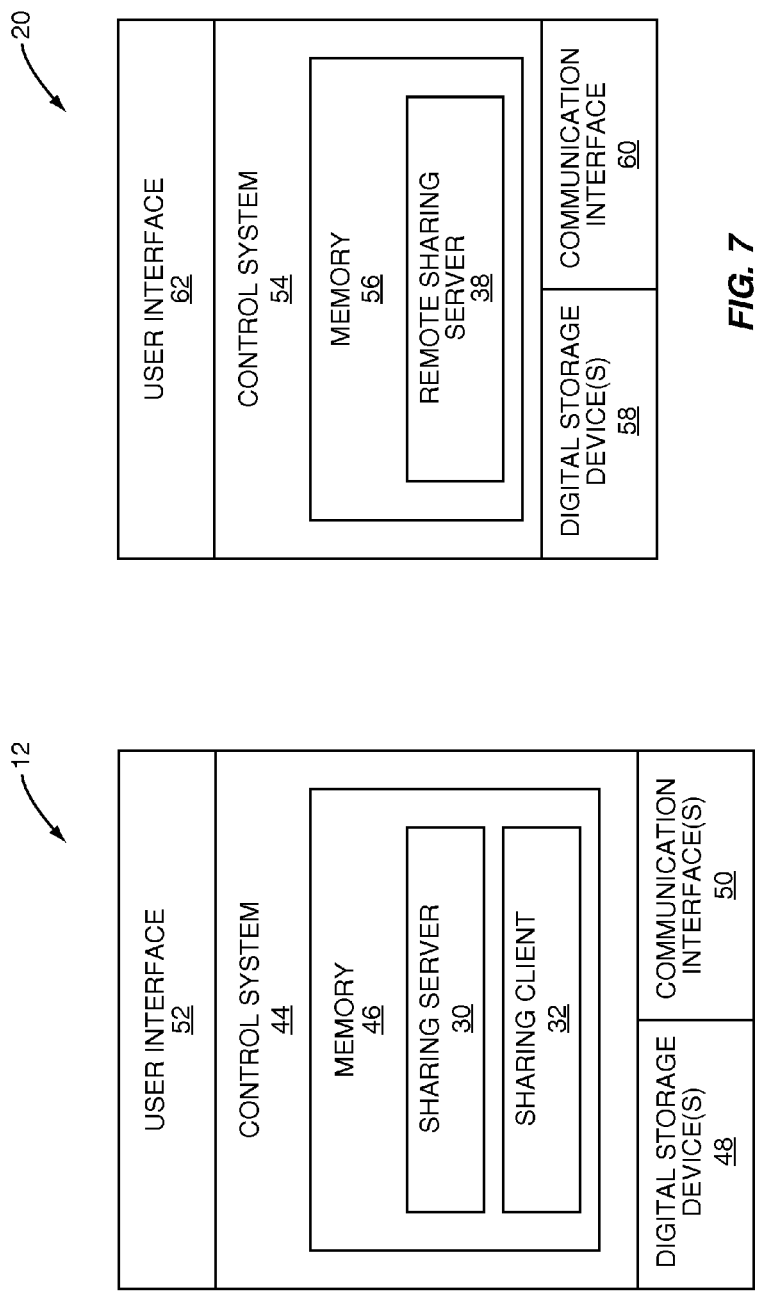

SYSTEM AND METHOD FOR CONTENT RIGHTS BASED ON EXISTENCE OF A VOICE SESSION

FIELD OF THE INVENTION

The present invention relates to sharing content and more particularly relates to granting access rights to shared content based on the existence of a voice session.

BACKGROUND OF THE INVENTION

Mobile telecommunications devices, such as mobile smart phones, are becoming prolific. Such devices enable users to play songs, play videos, view pictures, view documents, and the like. There is a need for a system and method for sharing content among users of mobile telecommunications devices.

SUMMARY OF THE INVENTION

The present invention relates to providing digital content access rights to shared content based on the existence of a voice session, such as a mobile telecommunications voice call, between users. In general, in the preferred embodiment, a voice session is established between a first user and a second user via associated devices. Either automatically upon establishment of the voice session or upon request by the first user, access rights to content shared by the first user are granted to the second user. The content shared by the first user may be content hosted by the device of the first user, another device associated with the first user, a third-party service, or the like. The access rights granted to the second user allow access to the content shared by the first user while the voice session between the first and second users is active. In one embodiment, the access rights further provide that access to the content shared by the first user is denied once the voice session has been terminated. In another embodiment, residual rights may be granted to the second user to allow the second user to access the content shared by the first user after the voice circuit has been terminated.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 6 is a block diagram of one of the mobile devices of FIG. 2 according to one embodiment of the present invention;

FIG. 7 is a block diagram of the user device of FIG. 2 according to one embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
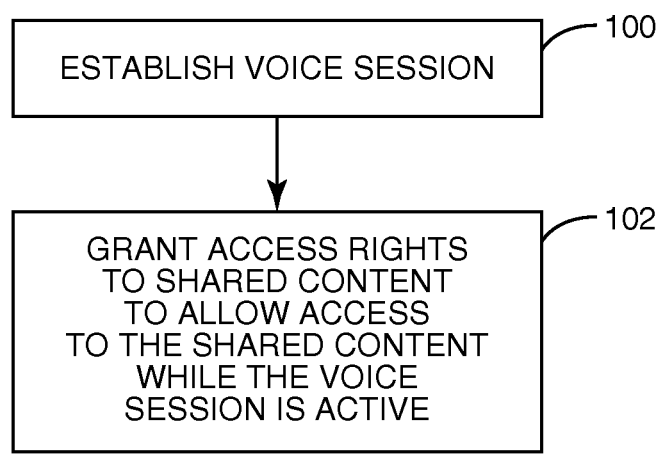
FIG. 1 is a flow chart for a process for granting access to shared content based on the existence of a voice session according to one embodiment of the present invention.

The present invention relates to granting access rights to shared content based on the existence of a voice session, such as a mobile telecommunications voice call, between users. FIG. 1 is a flow chart illustrating a process for granting access rights based on the existence of a voice session according to one embodiment of the present invention. First, a voice session between two users is established (step 100). The voice session is preferably a mobile telecommunications voice session, or voice call, established between the first and second users via associated mobile devices. However, the present invention is not limited thereto. The present invention is equally applicable to any type of packet-based or circuit-switched voice session. For example, the present invention is equally applicable to a voice session established using Session Initiation Protocol (SIP) or other Voice Over Internet Protocol (VoIP). As more specific examples, the present invention is equally applicable to voice sessions such as, for example, a voice session established via devices utilizing a VoIP service such as Skype, a voice session established via a chat application providing a voice chat feature such as Yahoo!® Instant Messenger (IM), or the like.

Next, access rights to content shared by the first user are granted to the second user where the access rights allow access to the content shared by the first user while the voice session between the first and second users is active (step 102). The access rights may be granted automatically upon establishment of the voice session between the first and second users. For example, the second user may be automatically granted access rights to all content shared by the first user. As another example, for each user or each of a number of groups of users, the first user may predefine rules identifying content that is to be shared with that user or group of users. For example, the first user may predefine rules indicating that all of his shared content is to be shared with users identified as friends of the first user, a first defined subset of his shared content is to be shared with users identified as co-workers, and a second defined subset of his shared content is to be shared with unknown users. The users may be identified by name such as that provided by a Caller ID feature, username, telephone number, or the like. If the shared content is media content such as music, the rules may also be defined using content metadata such as, for example, music genre, artist, album, year of release, or the like. As another example, if the shared content is pictures, the rules may also be defined using content metadata such as, for example, keywords or tags applied to the pictures, date of capture, album name, or the like. The content metadata may be provided using, for example, ID3 tags.

Access rights may additionally or alternatively be granted upon initiation of sharing all of the shared content of the first user or a defined subset of the shared content of the first user by the first user. For example, the first user may provide user input while the voice session is active indicating that all of his shared content or a defined subset thereof is to be shared with the second user. In response, the second user may be granted access rights to the shared content or defined subset thereof while the voice session is active.

The content shared by the first user may be content hosted by the device through which the first user is participating in the voice session, another device associated with the first user, a third-party service, or a combination thereof. For example, if the first user is participating in the voice session via a mobile telecommunications device, the content shared by the first user may be content hosted by the mobile telecommunications device of the first user; content hosted by another device associated with the first user such as, for example, a personal computer of the first user, a Digital Video Recorder (DVR) of the first user, an Apple TV® device, or the like; content hosted by a third-party service, such as a content server, on behalf of the first user or to which the first user has access rights. The third-party service may be, for example, a photo-sharing service hosting one or more photo albums for the first user, a video sharing service hosting one or more videos for the first user, a content server hosting one or more songs to which the first user has acquired rights via, for example, purchasing the songs or subscribing to a music service, or the like.

Note that in addition to granting access rights to the second user to content shared by the first user, access rights may also be granted to the first user to content shared by the second user. Again, access rights may be granted to the first user automatically, in response to input from the second user, or both automatically and in response to input from the second user.

In one embodiment, the access rights granted to the second user provide that access to the content by the second user is no longer permitted once the voice session between the first and second users is terminated. In other words, once the voice session between the first and second users is terminated, the access rights granted to the second user for the content shared by the first user are also terminated. Likewise, if access rights have been granted to the first user for content shared by the second user, the access rights granted to the first user provide that access to the content shared by the second user by the first user is no longer permitted once the voice session between the first and second users is terminated.

In an alternative embodiment, residual access rights for the shared content, or some portion thereof, may be granted. More specifically, the access rights granted to the second user may provide that, once the voice session is terminated, the second user may still be permitted to access the content shared by the first user for an additional amount of time defined by residual rights granted to the second user. In one embodiment, the residual access rights explicitly or implicitly define an amount of time after the voice session between the first and second users has been terminated that the second user continues to have rights to access the content shared by the first user. For example, the residual access rights may allow the second user to access the content shared by the first user for a defined amount of time after the voice session has been terminated such as five (5) minutes, one (1) hour, or the like.

As another example, the residual access rights may allow the second user to access the content for a remainder of the day. As a final example, if the second user is currently playing a media item shared by the first user, the residual access rights may allow the second user to access the media for an additional amount of time that is sufficient for the second user to complete playback of the media item. Thus, if the second user is playing a song shared by the first user having a play length of two (2) minutes and the voice session is terminated when playback of the song is at the one minute and thirty seconds (1:30) mark, the residual rights may provide the second user access rights to the song for an additional thirty (30) seconds after the voice session is terminated in order to allow the second user to complete playback of the song.

In addition or alternatively, the residual access rights may be defined by one or more predetermined user actions. For example, if the content shared by the first user is a playlist and associated songs referenced by the playlist, the residual access rights may be granted to the second user such that the second user continues to have access to the playlist and the songs referenced by the playlist after the voice session is terminated until playback of the playlist is complete. This type of residual rights is not based on time. Thus, if the second user pauses playback of the playlist or playback of the playlist is otherwise interrupted, the second user may still have access to the playlist until playback of the playlist is completed.

Figure 2:
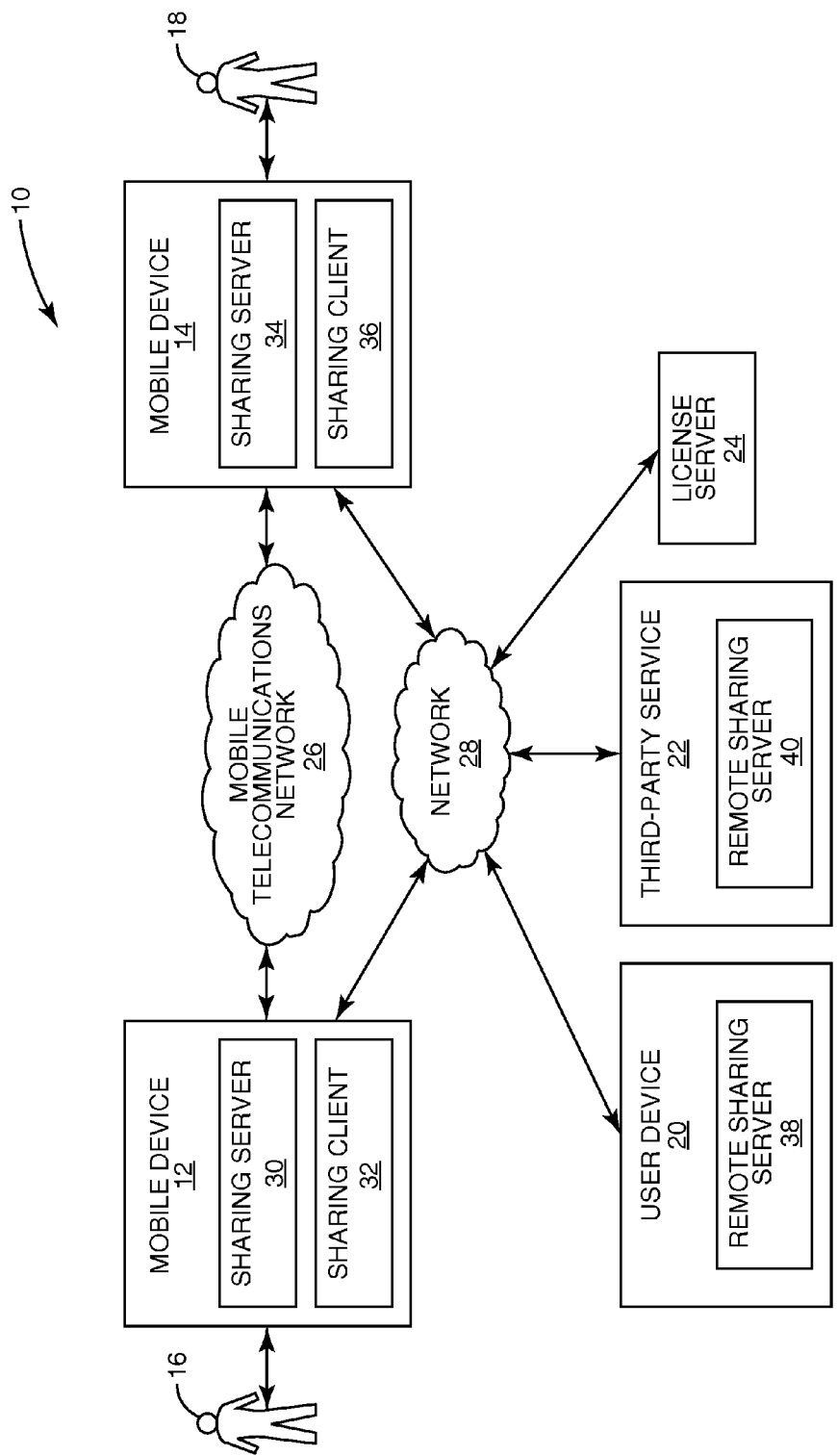
FIG. 2 illustrates a system wherein access rights to shared content are granted based on the existence of a voice session according to one embodiment of the present invention.

FIG. 2 illustrates a system 10 for granting access rights to shared content based on the existence of a voice session according to one embodiment of the present invention. In general, the system 10 includes mobile telecommunications devices 12 and 14, which are hereinafter referred to as mobile devices 12 and 14, having associated users 16 and 18. In addition, in this embodiment, the system 10 includes a user device 20, a third-party service 22, and a license server 24. As discussed below, the mobile devices 12 and 14 establish a voice session between the users 16 and 18 via a mobile telecommunications network 26. The mobile telecommunications network 26 may be, for example, a Global System for Mobile communications (GSM) network, an Enhanced Data rates for GSM Evolution (EDGE) network, a Code Division Multiple Access (CDMA) network, a Wideband CDMA (W-CDMA) network, or the like. In addition, the mobile devices 12 and 14 may communicate with one another, the user device 20, the third-party service 22, and the license server 24 via a network 28. The network 28 may be a Wide Area Network (WAN) such as, for example, the Internet. Note that while the mobile telecommunications network 26 and the network 28 are illustrated separately for clarity, one of ordinary skill in the art will appreciate that the mobile devices 12 and 14 may have access to the network 28 via the mobile telecommunications network 26, via a local wireless interface such as a Bluetooth® or IEEE 802.11x interface, or the like. Further, in one embodiment, the networks 26 and 28 may be the same network or a single network. Also, in an alternative embodiment, only the network 26 or only the network 28 may be used to both establish voice sessions and sharing of content according to granted access rights.

The mobile devices 12 and 14 are generally mobile telecommunication devices such as mobile smart phones or the like. For example, the mobile devices 12 and 14 each may be, or be similar to, an Apple® iPhone. The mobile device 12 includes a sharing server 30 and a sharing client 32, each of which may be implemented in software, hardware, or a combination thereof. The sharing server 30 generally operates to grant access rights to content shared by the user 16 upon establishment of a voice session with, for example, the user 18. In addition, the sharing server 30 provides sharing of content shared by the user 16 that is hosted by the mobile device 12, if any. The sharing client 32 generally operates to receive access rights for content shared with the user 16 during the existence of a voice session and enforce the access rights when accessing and, optionally, obtaining all or a portion of the shared content. Likewise, the mobile device 14 includes a sharing server 34 and a sharing client 36.

The user device 20 is associated with the user 16. For example, the user device 20 may be a personal computer of the user 16, a set-top box of the user 16, a set-top box of the user 16 having video recording capabilities, a DVR of the user 16, a device providing storage and playback of purchased media items such as an Apple TV® device, or the like. The user device 20 includes a remote sharing server 38, which may be implemented in software, hardware, or a combination thereof. The remote sharing server 38 generally operates to enable sharing of content hosted by the user device 20.

The third-party service 22 may generally be any type of service hosting content on behalf of the user 16 or content to which the user 16 has acquired rights via, for example, purchasing the content or paying a subscription fee to have access to the content. For example, the third-party service 22 may be, for example, a photo-sharing service such as, but not limited to, a photo sharing website hosting one or more photo albums for the first user; a video sharing service such as, but not limited to, a video sharing website hosting one or more videos for the first user; a service hosting one or more media items (e.g., songs, videos, audio books, etc.) to which the first user has acquired rights via, for example, payment of a purchase price or subscription fee; or the like. The third-party service 22 includes a remote sharing server 40, which may be implemented in software, hardware, or a combination thereof. In general, the remote sharing server 40 enables sharing of content hosted by the third-party service 22 as discussed herein.

The license server 24 generally operates to assist the sharing clients 32 and 36 in enforcing access rights based on licenses according to one embodiment of the present invention. As discussed below, in one embodiment, access rights are granted by issuing a license. The license may be generated by the sharing server 30, 34 of the user 16, 18 sharing the content. Alternatively, the license may be generated by the license server 24 at the request of the sharing server 30, 34 of the user 16, 18 sharing the content. The license server 24 may then operate to revoke the access rights granted by the licenses after the corresponding voice sessions are terminated and, optionally, after any residual access rights have expired. Note that, in an alternative embodiment, the functionality of the license server 24 may be distributed among the mobile devices 12 and 14. For example, the mobile device 12 may host or otherwise operate as a license server for licenses issued by the sharing server 30 of the mobile device 12.

Figure 3:
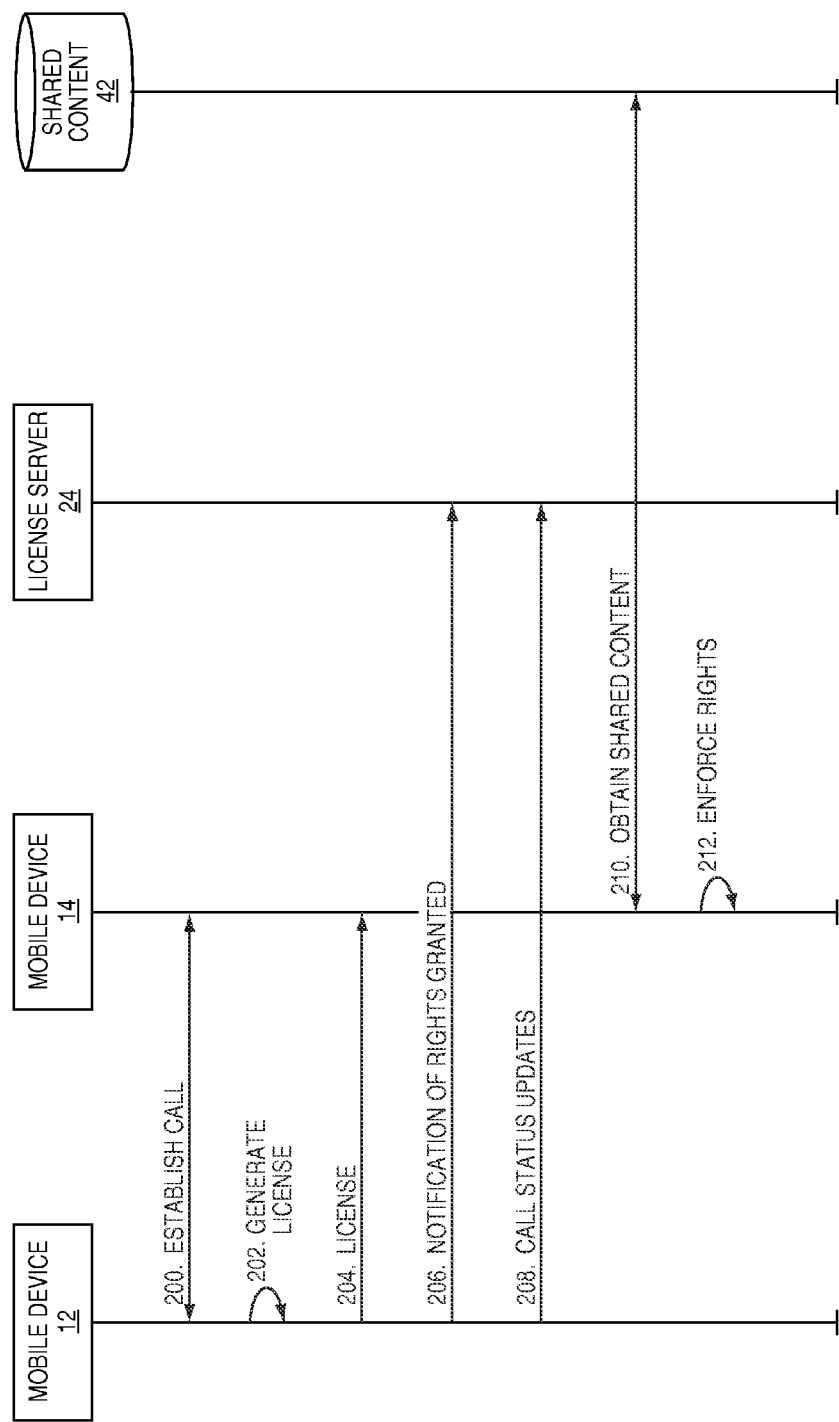
FIG. 3 illustrates the operation of the system of FIG. 2 according to one embodiment of the present invention.

FIG. 3 illustrates the operation of the system 10 of FIG. 2 according to one embodiment of the present invention. First, a voice session, or in this exemplary embodiment a call, is established between the mobile device 12 of the user 16 and the mobile device 14 of the user 18 via the mobile telecommunications network 26 (step 200). After the call is established, the mobile device 12, and more specifically the sharing server 30, generates a license granting access rights to the user 18 for all content shared by the user 16 or some defined subset thereof (step 202). Alternatively, the license may be generated and granted prior to establishing the call such as, for example, upon initiation of the call by one of the users 16 and 18. For example, the license may be generated and granted when the user 16 enters the mobile telephone number of the user 18 and presses "send" in order to initiate a call with the user 18 or when the user 16 selects the user 18 from a contact list in order to initiate a call with the user 18. In one embodiment, the license indicates that the user 18 has been granted rights to content shared by the user 16 or some defined subset thereof while the call between the users 16 and 18 is active. In addition, the license may define a time-out period after which the license must be renewed by the license server 24. Still further, the license may define residual access rights granted to the user 18 to permit access to the shared content or some defined subset thereof after the call between the users 16 and 18 has been terminated.

The sharing server 30 of the mobile device 12 then provides the license to the mobile device 14 via, in this example, the network 28 (step 204) and notifies the license server 24 of the access rights granted to the user 18 (step 206). In an alternative embodiment, rather than the sharing server 30 generating the license and sending the license to the mobile device 14, the license server 24 may generate the license in response to the notification of the rights granted to the user 18 and send the license to the mobile device 14 of the user 18. In this embodiment, the mobile device 12 periodically provides call status updates to the license server 24 (step 208). The call status updates may indicate that the call is still active. In addition, a call status update indicating that the call has ended may be provided by the mobile device 12 to the license server 24 when the call between the users 16 and 18 has ended.

After receiving the license, the mobile device 14, and more specifically the sharing client 36, obtains the content shared with the user 18, which in FIG. 3 is referred to as shared content 42 (step 210). As discussed above, the shared content 42 may be hosted by one or more of the mobile device 12, the user device 20, and the third-party service 22. In one embodiment, metadata describing the shared content 42 is first obtained by the sharing client 36 of the mobile device 14. The shared content 42 includes a number of shared content items such as songs, videos, pictures, documents, or the like. For each shared content item, the metadata includes a reference to the shared content item, such as a Uniform Resource Locator (URL), at the one of the mobile device 12, the user device 20, and the third-party service 22 hosting the shared content item. In addition, the metadata may include file names of the shared content items, titles of the shared content items such as songs and videos, thumbnail images for shared pictures, key frames or previews for shared videos, or the like.

In one embodiment, the mobile device 12 stores the metadata for all of the shared content items in the shared content 42 regardless of whether the shared content items are hosted by the mobile device 12, the user device 20, or the third-party service 22. The mobile device 12 may then push the metadata for the shared content 42 to the mobile device 14 as part of the license or in association with the license. Alternatively, the sharing client 36 of the mobile device 14 may request the metadata for the shared content 42 from the mobile device 12 in response to receiving the license.

In another embodiment, for each shared content item in the shared content 42, the sharing client 36 obtains the metadata for the shared content item from the one of the mobile device 12, the user device 20, or the third-party service 22 hosting the shared content item. The sharing client 36 may request the metadata for the shared content 42 from the mobile device 12, the user device 20, and/or the third-party service 22 using references, such as URLs, provided as part of the license or in association with the license. Alternatively, the mobile device 12, the user device 20, and/or the third-party service 22 may push the metadata for the shared content 42 to the mobile device 14. Note that in this case, the sharing server 30 of the mobile device 12 may instruct the user device 20 and the third-party service 22 to push the metadata for the shared content items that they are hosting to the mobile device 14. Note that, in an alternative embodiment, a mediating server may perform all or a portion of the functions of the sharing server 30. For example, the mediating server may detect the initiation or establishment of the voice session between the users 16 and 18. In response, the mediating server may generate and send the license to the mobile device 14 or cause the license to be generated and sent to the mobile device 14. In addition, the mediating server may instruct the user device 20 and the third-party service 22 to push the metadata for the shared content items that they are hosting to the mobile device 14 or obtain the metadata from the user device 20 and the third-party service 22 on behalf of the mobile device 14.

After receiving the metadata, the sharing client 36 enables the user 18 to select one or more of the shared content items that the user 18 desires to obtain. Alternatively, one or more of the shared content items that are to be obtained may be automatically selected based on one or more criteria such as, for example, preferences of the user 18, a topic of the conversation between the users 16 and 18 which may be inferred from the voice data exchanged over the voice session, or the like. In response, the sharing client 36 obtains the selected shared content items using the references included in the metadata for the shared content 42. For example, if one of the selected shared content items is hosted by the user device 20, the sharing client 36 uses the corresponding reference in the metadata for the shared content 42 to request the selected shared content item from the user device 20.

Alternatively, rather than first obtaining metadata for the shared content 42, all of the shared content 42 may be automatically pushed to the mobile device 14 or automatically requested by the mobile device 14. More specifically, in one embodiment, the mobile device 12 may automatically push any shared content that has been shared with the user 18 to the mobile device 14 of the user 18. In addition, the mobile device 12 may automatically instruct the user device 20 and the third-party service 22 to push any shared content that has been shared with the user 18 to the mobile device 14 of the user 18. Alternatively, the mobile device 12 may provide one or more references, such as URLs, to the mobile device 14 within the license or in association with the license that enable the sharing client 36 to automatically obtain all of the shared content 42 from the mobile device 12, the user device 20, and the third-party service 22. As another alternative, at least a portion of the shared content 42 may be automatically selected based on one or more criteria and automatically pushed to the mobile device 14 of the user 18. The criteria may include preferences of the user 18, a topic of the conversation between the users 16 and 18, or the like.

The sharing client 36 of the mobile device 14 also enforces the access rights granted by the license (step 212). The sharing client 36 enforces access rights granted by the license before allowing access to shared content items. In addition, the sharing client 36 may enforce the access rights granted by the license before requesting the shared content 42 from the mobile device 12, the user device 20, and/or the third-party service 22. Using a shared media item as an example, the sharing client 36 may enforce the access rights before allowing playback of the media item and may thereafter periodically enforce the access rights during playback of the media item. Note that once the call has been terminated, the access rights granted to the user 18 are terminated. Optionally, as discussed above, the license may grant residual rights that enable the user 18 to access the shared content 42, or some portion thereof, for some additional amount of time.

Figure 4:
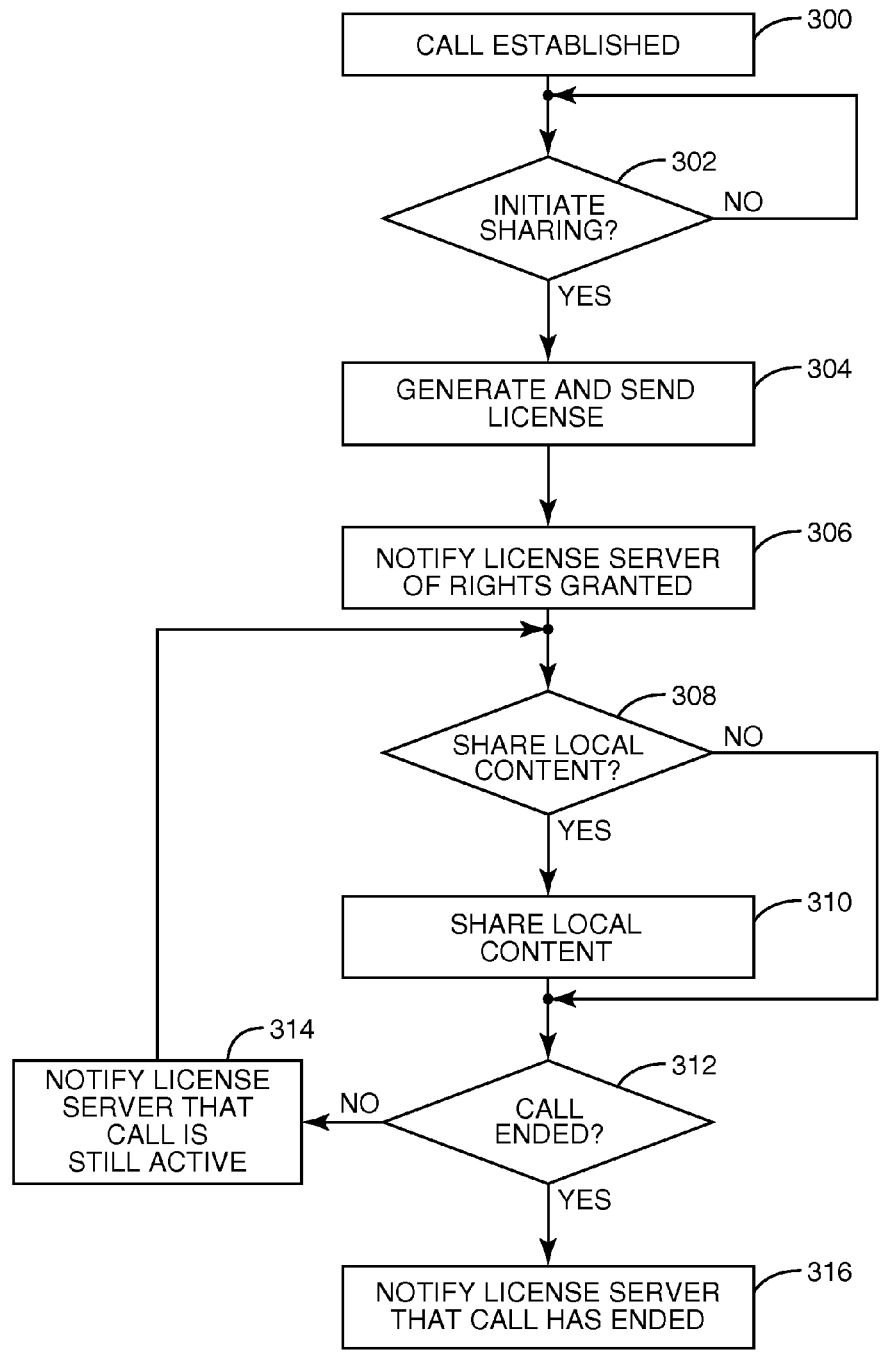
FIG. 4 is a flow chart illustrating the operation of one of the sharing servers of FIG. 2 according to one embodiment of the present invention.

FIG. 4 is a flow chart illustrating the operation of the sharing server 30 of the mobile device 12 of FIG. 2 according to one embodiment of the present invention. This discussion is equally applicable to the sharing server 34 of the mobile device 14. First, a call is established between the users 16 and 18 (step 300). Upon detecting or being notified that a call has been established, the sharing server 30 determines whether to initiate sharing of content with the user 18 (step 302). Again, sharing may be initiated automatically or manually. If initiated automatically, all shared content of the user 16 may be shared with the user 18. Alternatively, a portion of the shared content of the user 16 may be shared with the user 18, where the portion shared with the user 18 may be automatically selected based on user-based or group-based rules defined by the user 16. Each user-based or group-based rule defines a portion of the shared content of the user 16 to be shared with a corresponding user or group of users. Thus, the portion of the shared content of the user 16 that is shared with the user 18 may be determined based on a user-based rule defined for the user 18 or a group-based rule for a group of users to which the user 18 belongs. Note that the user-based or group-based rules may identify content items to be shared with the corresponding user or group of users; groups of content items, such as folders or photo albums, to be shared with the corresponding user or group of users; types of content items to be shared with the corresponding user or group of users; or the like. In addition or alternatively, a portion of the shared content of the user 16 selected for sharing with the user 18 may be selected or recommended based on a topic of the conversation between the users 16 and 18 inferred from voice data exchanged via the voice session. Thus, if the users 16 and 18 are discussing the vacation that the user 16 took to the beach, the sharing server 30 may select a photo album entitled "Vacation at the Beach" as content to share with the user 18.

If sharing is initiated manually, the user 16 may select one or more content items, one or more groups of content items, one or more types of content items, or the like to share with the user 18. The content items may be selected via any type of user input. For example, the content items may be selected via a keypad, touch screen, or similar user input device. As another example, the content items may be selected via a voice command.

Once sharing has been initiated, in this embodiment, the sharing server 30 generates a license providing access rights to the user 18 for the content shared with the user 18 and sends the license to the mobile device 14 of the user 18 (step 304). Again, the license includes information defining the access rights granted to the user 18. In addition, the license may define a time-out period after which the license must be renewed. Still further, the license may define residual rights granted to the user 18 to enable access to the shared content, or some portion thereof, after the call between the users 16 and 18 has ended. The sharing server 30 also notifies the license server 24 of the rights granted to the user 18 (step 306).

At this point, the sharing server 30 determines whether the access rights granted to the user 18 include access rights to any local content stored by the mobile device 12 (step 308). If not, the process proceeds to step 312, which is discussed below. If so, the sharing server 30 operates to share the local content to which the user 18 has been granted access rights with the user 18 (step 310). More specifically, depending on the embodiment, the sharing server 30 either pushes metadata for the local content shared with the user 18 to the mobile device 14, responds to any request from the mobile device 14 for the metadata for the local content shared with the user 18, pushes the local content shared with the user 18 to the mobile device 14, or responds to any requests from the mobile device 14 for the local content shared with the user 18. Note that if it is desired to automatically push shared content or metadata for the shared content from the user device 20 and the third-party service 22 to the mobile device 14 of the user 18, then the sharing server 30 may instruct the user device 20 and the third-party service 22 to push the shared content or metadata for the shared content hosted by them to the mobile device 14 of the user 18 at some time after the determination is made to share the content with the user 18.

At some point while sharing the local content or if no local content has been shared with the user 18, the sharing server 30 determines whether the call with the user 18 has ended (step 312). If not, the sharing server 30 sends a call status update to the license server 24 to notify the license server 24 that the call is still active (step 314), and then the process returns to step 308 and is repeated. In this manner, call status updates may be provided periodically to the license server 24 to notify the license server 24 that the call is still active. Once the call has ended, in this embodiment, the sharing server 30 sends a call status update to the license server 24 notifying the license server 24 that the call has ended (step 316). In response, the license server 24 terminates the access rights granted to the user 18 via, for example, denying renewal of the license granted to the user 18 after the time-out period has expired.

Figure 5:
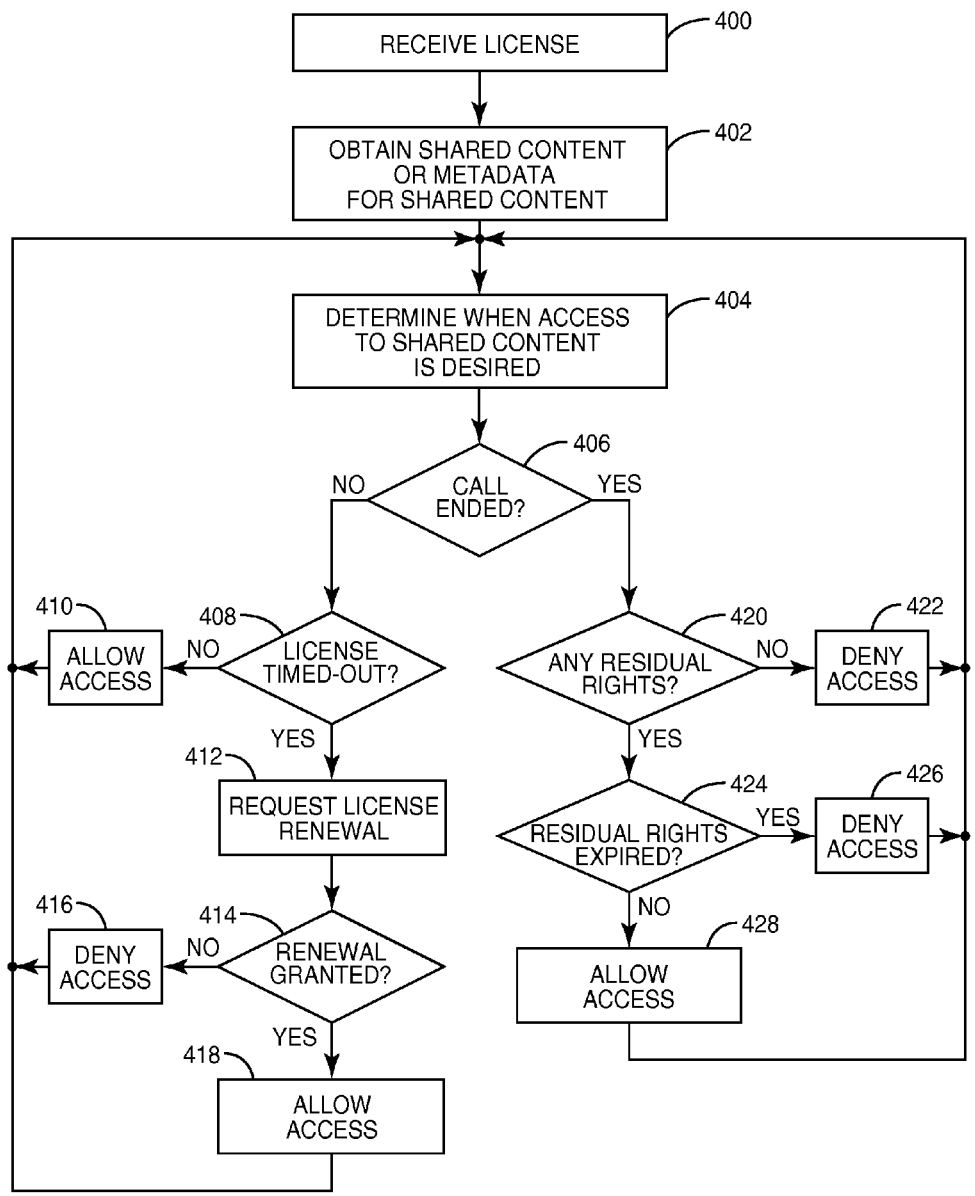
FIG. 5 is a flow chart illustrating the operation of one of the sharing clients of FIG. 2 according to one embodiment of the present invention.

FIG. 5 illustrates the operation of the sharing client 36 of the mobile device 14 according one embodiment of the present invention. This discussion is equally applicable to the sharing client 32 of the mobile device 12. Note that the following discussion continues the example where a call has been established between the users 16 and 18. First, the sharing client 36 receives the license granting access rights to the user 18 to content shared by the user 16 based on the existence of the call between the users 16 and 18 (step 400). Next, the sharing client 36 obtains the shared content or metadata for the shared content (step 402). In one embodiment, the shared content, or some select portion thereof, is automatically pushed to the sharing client 36 from one or more of the sharing server 30 of the mobile device 12, the remote sharing server 38 of the user device 20, and the remote sharing server 40 of the third-party service 22 hosting the shared content.

In another embodiment, metadata for the shared content is pushed to the sharing client 36 from the sharing server 30 of the mobile device 12 or pushed to the sharing client 36 from the sharing server 30 of the mobile device 12 and the remote sharing servers 38 and 40 of the user device 20 and the third-party service 22, respectively. Alternatively, the sharing client 36 may request the metadata for the shared content using one or more references, such as URLs, provided within or in association with the license. The metadata includes references to the content items shared with the user 18. The user 18 is then enabled to select one or more of the shared content items, one or more groups of the shared content items, one or more types of shared content items, or the like to obtain. Alternatively, the shared content items to obtain may be automatically selected based on preferences of the user 18, a topic of the conversation between the users 16 and 18, or the like. The preferences of the user 18 may indicate, for example, one or more preferred content types that are to be automatically obtained, one or more preferred users for which shared content is to be automatically obtained, or the like. The selected content items are then requested and received from the mobile device 12, the user device 20, or the third-party service 22 hosting the selected content items using the references included in the metadata for the shared content. Note that before requesting a shared content item, the sharing client 36 may determine whether access to the shared content item is permitted by the license granting access rights to the user 18 in the manner discussed below.

Next, the sharing client 36 determines when access to a shared content item is desired (step 404). Accessing a shared content item may include, for example, opening a document, opening a picture file to initiate viewing of a picture, starting playback of a song, starting playback of a video, or the like. Still further, accessing a shared content item may include the continued accessing of a shared content item while the shared content item is being consumed by the user 18. As used herein, consumed refers to viewing a document, viewing a picture, listening to a song, viewing a video, or the like. As an example, if the shared content item is a media item, the user 18 may select the shared content item for playback. However, before the sharing client 36 permits access to the media item, the sharing client 36 enforces the license granted to the user 18, thereby determining whether access to the media item is permitted. Still further, as the media item is played, the sharing client 36 may continue to enforce the license by periodically determining whether access to the media item is still permitted.

In order to enforce the license, in this embodiment, the sharing client 36 determines whether the call has ended (step 406). If not, the sharing client 36 determines whether the license has timed-out or, in other words, whether the time-out period for the license has expired (step 408). If the call has not ended and the license has not timed-out, access to the shared content item is allowed, or permitted (step 410), and the process then returns to step 404. If the license has timed-out, the sharing client 36 sends a request to the license server 24 to renew the license (step 412). In response, the license server 24 determines whether the call has ended or whether the user 16 has chosen to revoke the license. Note that the user 16 may choose at any time during the call to revoke the access rights granted to the user 18. The license server 24 may determine that the call has ended if a call status update indicating that the call is still active has not been received from the mobile device 12 within at least a threshold amount of time. Alternatively, when the call has ended, the license 24 may receive a call status update indicating that the call has ended from the mobile device 12. If the license server 24 determines that the call has not ended and the user 16 has not revoked the access rights granted to the user 18, the license server 24 renews the license granted to the user 18. Otherwise, the license server 24 does not renew the license. Based on a response from the license server 24, the sharing client 36 determines whether the license has been renewed (step 414). If not, access to the shared content item is denied (step 416), and the process returns to step 404. If the license was renewed, access to the shared content item is allowed (step 418), and the process then returns to step 404.

Returning to step 404, if the call has ended, the sharing client 36 determines whether the license grants any residual access rights to the user 18 (step 420). Again, the residual access rights generally provide access rights to the user 18 for some additional amount of time after the call between the users 16 and 18 has ended. The residual access rights may be for all of the shared content or a portion of the shared content. For example, the residual access rights may provide that the user 18 is permitted to access all of the content initially shared with the user 18 for an additional five (5) minutes after the call has ended, an additional hour after the call has ended, or for the remainder of the day after the call has ended. As another example, if the user 18 is playing a shared media item at the time the call is ended, the residual access rights may provide that the user 18 is granted additional access rights to the shared media item for an amount of time sufficient to enable that user 18 to complete playback of the media item.

If the user 18 has not been granted residual access rights, access to the shared content item is denied (step 422), and the process then returns to step 404. If the user 18 has been granted residual access rights, the sharing client 36 determines whether the residual access rights have expired (step 424). If so, access to the shared content item is denied (step 426), and the process then returns to step 404. If the residual access rights have not expired, the sharing client 36 allows access to the shared content item (step 428), and then the process returns to step 404.

FIG. 6 is a block diagram of the mobile device 12 of FIG. 2 according to one embodiment of the present invention. This discussion is equally applicable to the mobile device 14. In general, the mobile device 12 includes a control system 44 having associated memory 46. In this embodiment, the sharing server 30 and the sharing client 32 are implemented in software and stored in the memory 46. However, the present invention is not limited thereto. The sharing server 30 and the sharing client 32 may each be implemented in software, hardware, or a combination thereof. In addition, the mobile device 12 includes one or more digital storage devices 48 such as one or more hard-disk drives, one or more internal or removable memory devices, or the like. Content such as songs, videos, pictures, documents, and the like may be stored by the one or more digital storage devices 48 and shared by the user 18 if desired. Note that some or all of the content may alternatively be stored in the memory 46. The mobile device 12 also includes one or more communications interfaces 50 for connecting to the mobile telecommunications network 26 and the network 28 (FIG. 2). Lastly, the mobile device 12 includes a user interface 52, which may include, for example, one or more user input devices such as a keypad, touch screen, and a microphone, a display, one or more speakers, or the like.

FIG. 7 is a block diagram of the user device 20 of FIG. 2 according to one embodiment of the present invention. In general, the user device 20 includes a control system 54 having associated memory 56. In this embodiment, the remote sharing server 38 is implemented in software and stored in the memory 56. However, the present invention is not limited thereto. The remote sharing server 38 may be implemented in software, hardware, or a combination thereof. In addition, the user device 20 includes one or more digital storage devices 58 such as one or more hard-disk drives, one or more internal or removable memory devices, or the like. Content such as songs, videos, pictures, documents, and the like may be stored by the one or more digital storage devices 58 and shared by the user 18 if desired. Note that some or all of the content may alternatively be stored in the memory 56. The user device 20 also includes a communication interface 60 for connecting to the network 28 (FIG. 2). Lastly, the user device 20 may include a user interface 62, which may include, for example, one or more user input devices, a display, or the like.

Figure 8:
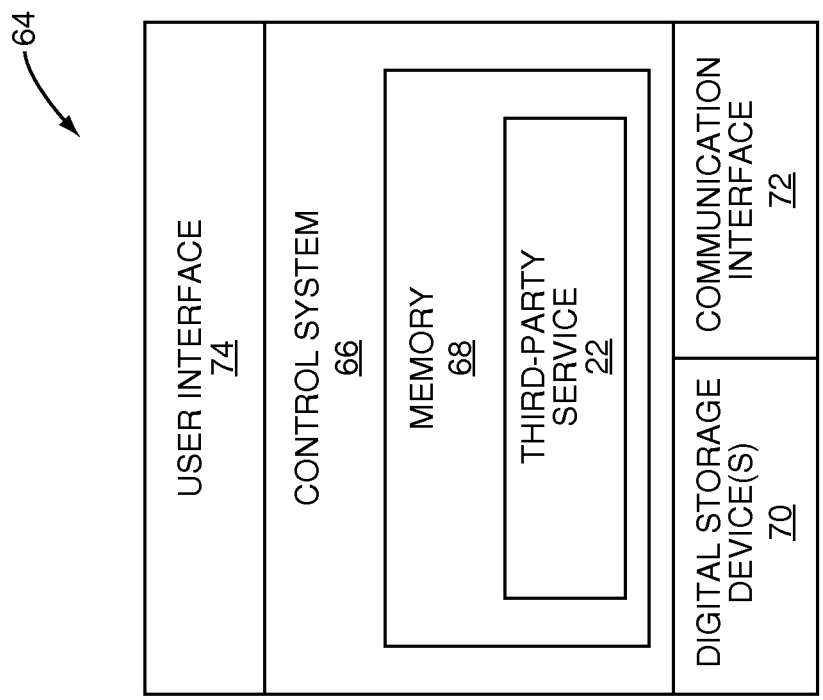
FIG. 8 is a block diagram of one of the devices hosting the third-party service of FIG. 2 according to one embodiment of the present invention.

FIG. 8 is a block diagram of a device 64, such as a server, providing the third-party service 22 of FIG. 2 according to one embodiment of the present invention. In general, the device 64 includes a control system 66 having associated memory 68. In this embodiment, the third-party service 22 is implemented in software and stored in the memory 68. However, the present invention is not limited thereto. The third-party service 22 may be implemented in software, hardware, or a combination thereof. In addition, the device 64 includes one or more digital storage devices 70 such as one or more hard-disk drives, one or more internal or removable memory devices, or the like. Content items such as songs, videos, pictures, documents, and the like may be stored by the third-party service 22 in the one or more digital storage devices 70. The content items may include content items stored on behalf of the user 16 as well as a number of other users, content items to which the user 16 has acquired rights by payment of a purchase price or subscription fee, or the like. The content items stored on behalf of the user 16 or to which the user 16 has acquired rights may be shared by the user 16 if desired. Note that some or all of the content may alternatively be stored in the memory 68. The device 64 also includes a communication interface 72 for connecting to the network 28 (FIG. 2). Lastly, the device 64 may include a user interface 74, which may include, for example, one or more user input devices, a display, or the like.

Figure 9:
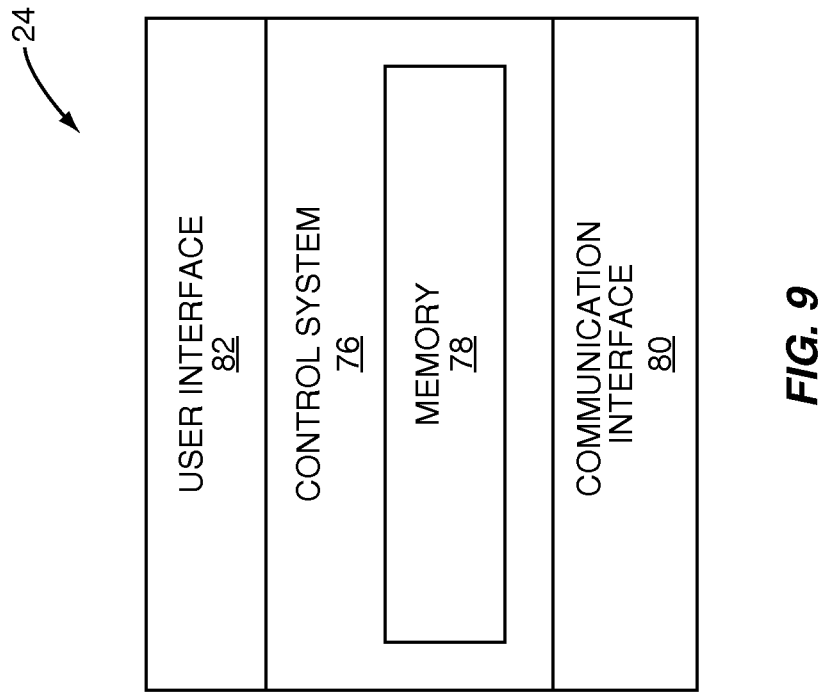
FIG. 9 is a block diagram of the license server of FIG. 2 according to one embodiment of the present invention.

FIG. 9 is a block diagram of the license server 24 of FIG. 2 according to one embodiment of the present invention. In general, the license server 24 includes a control system 76 having associated memory 78. In this embodiment, the memory includes software instructing the license server 24 to operate as discussed herein. However, the present invention is not limited thereto. The functionality of the license server 24 discussed herein may be provided by software, hardware, or a combination thereof. The license server 24 also includes a communication interface 80 for connecting to the network 28 (FIG. 2). Lastly, the license server 24 may include a user interface 82, which may include, for example, one or more user input devices, a display, or the like.

The present invention provides substantial opportunity for variation without departing from the spirit or scope of the present invention. As a first example, while the exemplary embodiments discussed above focus on the mobile devices 12 and 14, the present invention is not limited thereto. The present invention is equally applicable to any type of device capable of establishing a voice session between two users such as, for example, a personal computer.

As a second example, the content shared with, for example, the user 16 does not have to be accessible only on the mobile device 12 of the user 16. For example, access rights may be granted to the user 16 at the mobile device 12 and/or some other device of the user 16 such as, for example, the user device 20, which may be a personal computer of the user 16, a set-top box of the user 16, an Apple TV® device of the user 16, or the like. More specifically, when a call is established between the users 16 and 18, access rights may be granted to the user 16 for content shared by the user 18. These access rights may be represented by a license where the license may be provided to the user device 20 of the user 16 in addition to or as an alternative to sending the license to the mobile device 12 of the user 16. As a result, the user 16 is permitted to access the content shared by the user 18 at the user device 20 until the call has ended and, optionally, any residual rights have expired.

As a third example, while the discussion above focuses on a voice session established between two (2) users, the present invention is not limited thereto. More specifically, a conference call or similar multi-party voice session may be established. Access rights to content shared by one of the users participating in the conference call may be granted to one or more of the other users participating in the conference call. The users to which the access rights are granted may be manually selected by the sharing user or automatically selected based on one or more predefined user-based or group-based rules.

As a fourth example, while the discussion above focuses on using licenses to represent the granted access rights, the present invention is not limited thereto. For instance, a token may alternatively be used. As a final example, Digital Rights Management (DRM) techniques such as encryption of the shared content may additionally be used.

Those skilled in the art will recognize improvements and modifications to the preferred embodiments of the present invention. All such improvements and modifications are considered within the scope of the concepts disclosed herein and the claims that follow.

What is claimed is:

1. A method of operation of a device comprising:
    establishing a voice session between a first user at the device and a second user at a second device;
    granting access rights to the second user for content shared by the first user of the device in response to the establishment of the voice session between the first user and the second user such that the second user is permitted to access the content shared by the first user while the voice session is active, wherein at least a portion of the content shared by the first user is hosted by the device of the first user; and
    granting residual access rights to the second user for at least a portion of the content shared by the first user of the device for an additional amount of time after the voice session is terminated that lasts until playback of a playlist is completed, wherein granting the access rights to the second user further comprises granting the access rights to the second user such that the second user is denied access to the content shared by the first user once the voice session is terminated and the additional amount of time defined by the residual access rights has expired.

2. The method of claim 1 wherein granting the access rights to the second user further comprises granting the access rights to the second user such that the second user is denied access to the content shared by the first user once the voice session is terminated.

3. The method of claim 1 wherein the device of the first user and the second device of the second user are mobile telecommunications devices, and establishing the voice session comprises establishing a mobile telephone call.

4. The method of claim 1 wherein at least a portion of the content shared by the first user is hosted by another device of the first user.

5. The method of claim 1 wherein at least a portion of the content shared by the first user is hosted by a third-party service.

6. The method of claim 1 wherein granting the access rights comprises automatically granting the access rights to the second user upon establishing the voice session.

7. The method of claim 6 wherein the first user identifies content available for sharing, and automatically granting the access rights to the second user comprises automatically granting the access rights to the second user for all of the content identified by the first user as being available for sharing.

8. The method of claim 6 wherein the first user identifies content available for sharing, and automatically granting the access rights to the second user comprises automatically granting the access rights to the second user for at least a portion of the content identified by the first user as being available for sharing based on a user-based rule defined for the second user.

9. The method of claim 6 wherein the first user identifies content available for sharing, and automatically granting the access rights to the second user comprises automatically granting the access rights to the second user for at least a portion of the content identified by the first user as being available for sharing based on a group-based rule defined for a group of users including the second user.

10. The method of claim 6 wherein the first user identifies content available for sharing, and automatically granting the access rights to the second user comprises:
    detecting a topic of a conversation between the first user and the second user over the voice session; and
    automatically granting the access rights to the second user for at least a portion of the content identified by the first user as being available for sharing selected based on the topic of the conversation.

11. The method of claim 10 wherein detecting the topic of conversation comprises inferring the topic of conversation from voice data exchanged over the voice session.

12. The method of claim 1 wherein the first user identifies content available for sharing, and granting the access rights comprises:
    receiving, from the first user, user input that selects at least a portion of the content identified by the first user as being available for sharing as content to share with the second user; and
    granting, to the second user, access rights to the at least a portion of the content identified by the first user as being available for sharing based on an existence of the voice session between the first user and the second user.

13. The method of claim 1 wherein granting the access rights comprises:
    generating a license defining the access rights of the second user; and
    sending the license to the second device of the second user such that the second device is enabled to obtain and access the content shared by the first user according to the license.

14. The method of claim 1 wherein granting the access rights comprises:
    generating a license defining the access rights of the second user; and
    sending the license to another device of the second user such that the other device of the second user is enabled to obtain and access the content shared by the first user according to the license.

15. The method of claim 1 wherein granting the access rights comprises notifying a license server of the access rights granted to the second user such that the license server generates and sends a license defining the access rights of the second user to the second device of the second user and the second device is enabled to obtain and access the content shared by the first user according to the license.

16. The method of claim 1 wherein granting the access rights comprises notifying a license server of the access rights granted to the second user such that the license server generates and sends a license defining the access rights of the second user to another device of the second user and the other device of the second user is enabled to obtain and access the content shared by the first user according to the license.

17. The method of claim 1 wherein the voice session is initiated by the first user.

18. The method of claim 1 wherein the voice session is initiated by the second user.

19. The method of claim 1 wherein granting access rights comprises granting access rights according to a predefined rule.

20. The method of claim 19 wherein granting access rights according to a predefined rule comprises granting access rights to users identified by one of the group consisting of: caller id, user name, and telephone number.

21. The method of claim 19 wherein granting access rights according to a predefined rule comprises granting access rights to the second user based on content metadata.

22. The method of claim 21 wherein granting access rights according to content metadata comprises looking at metadata selected from the group consisting of:
keywords, tags, date of capture, and album name.

23. The method of claim 1 further comprising receiving access rights to content from the second user.

24. A device comprising:
at least one communication interface;
memory; and
a control system operatively coupled to the memory and associated with the communication interface and adapted to:
establish, via the at least one communication interface, a voice session between a first user at the device and a second user at a second device;
grant access rights to the second user for content shared by the first user of the device in response to the establishment of the voice session between the first user and the second user such that the second user is permitted to access the content shared by the first user while the voice session is active, wherein at least a portion of the content shared by the first user is hosted by the device of the first user; and
grant residual access rights to the second user for at least a portion of the content shared by the first user of the device for an additional amount of time after the voice session is terminated that lasts until playback of a playlist is completed, wherein granting the access rights to the second user further comprises granting the access rights to the second user such that the second user is denied access to the content shared by the first user once the voice session is terminated and the additional amount of time defined by the residual access rights has expired.

25. The device of claim 24 wherein the access rights granted to the second user deny access to the content shared by the first user once the voice session is terminated.

26. A non-transitory computer readable medium storing software for instructing a control system of a device to:
determine when a voice session is established between a first user at the device and a second user at a second device; and
grant access rights to the second user for content shared by the first user of the device in response to the establishment of the voice session between the first user and the second user such that the second user is permitted to access the content shared by the first user while the voice session is active, wherein at least a portion of the content shared by the first user is hosted by the device of the first user; and grant residual access rights to the second user for at least a portion of the content shared by the first user of the device for an additional amount of time after the voice session is terminated that lasts until playback of a playlist is completed, wherein granting the access rights to the second user further comprises granting the access rights to the second user such that the second user is denied access to the content shared by the first user once the voice session is terminated and the additional amount of time defined by the residual access rights has expired.

27. A method of operation of a device comprising:

establishing a voice session between a first user at the device and a second user at a second device; and granting access rights to the second user for content shared by the first user of the device in response to the establishment of the voice session between the first user and the second user, wherein at least a portion of the content shared by the first user is hosted by the device of the first user, wherein granting access rights comprises:

automatically granting the access rights to the second user upon establishing the voice session; and granting residual access rights to the second user for at least a portion of the content shared by the first user of the device for an additional amount of time after the voice session is terminated that lasts until playback of a playlist is completed, wherein granting the access rights to the second user further comprises granting the access rights to the second user such that the second user is denied access to the content shared by the first user once the voice session is terminated and the additional amount of time defined by the residual access rights has expired.

* * * * *